US008462682B2

(12) United States Patent
Ericson et al.

(10) Patent No.: US 8,462,682 B2
(45) Date of Patent: Jun. 11, 2013

(54) METHOD AND ARRANGEMENT FOR SEPARATE CHANNEL POWER CONTROL

(75) Inventors: Marten Ericson, Luleå (SE); Hans Hannu, Luleå (SE); Stefan Wanstedt, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 269 days.

(21) Appl. No.: 12/747,896

(22) PCT Filed: Dec. 14, 2007

(86) PCT No.: PCT/SE2007/051004
§ 371 (c)(1),
(2), (4) Date: Aug. 16, 2010

(87) PCT Pub. No.: WO2009/078761
PCT Pub. Date: Jun. 25, 2009

(65) Prior Publication Data
US 2010/0296422 A1   Nov. 25, 2010

(51) Int. Cl.
*H04B 7/00* (2006.01)

(52) U.S. Cl.
USPC .......................................... 370/310

(58) Field of Classification Search
USPC .......................... 370/310, 332, 333
See application file for complete search history.

(56) References Cited

U.S. PATENT DOCUMENTS

| | | | |
|---|---|---|---|
| 4,639,914 A * | 1/1987 | Winters | 370/334 |
| 4,744,083 A * | 5/1988 | O'Neill et al. | 714/704 |
| 6,549,785 B1 | 4/2003 | Agin | |
| 7,626,970 B2 | 12/2009 | Agin | |
| 7,853,283 B2 | 12/2010 | Usuda et al. | |
| 2002/0028691 A1 | 3/2002 | Moulsley et al. | |
| 2008/0056182 A1 | 3/2008 | Usuda et al. | |
| 2008/0200200 A1 | 8/2008 | Usuda et al. | |

FOREIGN PATENT DOCUMENTS

| | | | |
|---|---|---|---|
| EP | 1583256 A1 | | 10/2005 |
| GB | 2408420 A | * | 5/2005 |
| GB | 2413922 A | * | 11/2005 |
| JP | 2002033700 A | | 1/2002 |
| JP | 2004507927 A | | 3/2004 |
| JP | 2006186404 A | | 7/2006 |

(Continued)

OTHER PUBLICATIONS

3rd Generation Partnership Project. 3GPP TS 25.214, V8.0.0 (Nov. 2007). 3rd Generation Partnership Project; Technical Specification Group Radio Access Network; Physical layer procedures (FDD) (Release 8). Nov. 2007.

*Primary Examiner* — Mark Rinehart
*Assistant Examiner* — Mohammad Anwar
(74) *Attorney, Agent, or Firm* — Coats & Bennett, P.L.L.C.

(57) ABSTRACT

Method and arrangement in a first node, for generating a first and a second correctness target value. The generated correctness target values are used by a power control of the radio signals sent from a second node to be received by the first node. The radio signals are sent over at least a first channel and a second channel. The method comprises establishing a difference between the obtained first quality value of the first channel with a first quality target value of the first channel and generating a first correctness target value. The method also comprises the step of establishing a second difference between the obtained second quality value of the second channel with a second quality target value of the second channel and generating a second correctness target value.

16 Claims, 3 Drawing Sheets

FOREIGN PATENT DOCUMENTS

| | | |
|---|---|---|
| JP | 2007195224 A | 8/2007 |
| WO | 98/58461 | 12/1998 |
| WO | 02/17511 A2 | 2/2002 |
| WO | 2006051827 A1 | 5/2006 |
| WO | 2006098440 A1 | 9/2006 |
| WO | 2006104211 A1 | 10/2006 |

* cited by examiner

METHOD AND ARRANGEMENT FOR SEPARATE CHANNEL POWER CONTROL

TECHNICAL FIELD

The present invention relates to methods and arrangements in a communication system, in particular to methods and arrangements generating a first correctness target value and a second correctness target value, which correctness target values are used by a power control of the radio signals sent over at least a first channel and a second channel in a wireless communication system.

BACKGROUND

In communication systems based on e.g. Code Divisional Multiple Access (CDMA), power control is used to meet the desired quality of service targets. The power control may be implemented both in the user equipment to meet the downlink quality target and also in the base station to meet the uplink quality target. In wireless communication networks, the downlink is the transmission path from the base station to the user equipment, and the uplink is the transmission path from the user equipment to the base station. It is important that the power control is able to maintain the desired quality of service target despite varying radio conditions, which is often the case in wireless communication systems.

The following describes various technical aspects related to inner loop power control, outer loop power control and its convergence in CDMA systems. In particular the methods and devices described herein relates to Wideband Code Division Multiple Access (WCDMA) but may be equally applicable to other CDMA based technologies such as e.g. cdma2000 because power control, both inner and outer loop, is the hallmark of CDMA access technology. The methods may also be implemented in HSPA, and in particular the uplink variant of HSPA, also called Enhanced Up-Link (EUL) or HSUPA.

In CDMA systems the inner loop power control, also called fast power control, runs every time slot, which is typically less than 1 ms (e.g. 0.67 ms in WCDMA). In WCDMA the inner loop power control runs in both uplink and downlink. The fast inner-loop power control adjusts the transmit power of the sender towards a specific Signal to Interference and noise Ratio (SIR) target at the receiver. The aim of the uplink and downlink inner loop power controls is to counter the effect of fast fading, while maintaining the desired SIR target. In the uplink the power control also compensates for the near-far problem, so that the signal received from the users far out in the cell are not swamped out by the users' close to the base stations stronger signals. During every slot the user equipment estimates the SIR on some known reference or pilot symbols and compares it with some SIR target corresponding to the given service (e.g. Block Error Rate (BLER), certain Bit Error Rate (BER) requirements and spreading factor used etc.). In WCDMA, Downlink SIR is measured on Dedicated Physical Control Channel (DPCCH), which comprises pilot bits and Transmitter Power Control (TPC) bits. The TPC commands are also used for uplink power control and the pilot bits are primarily used for channel estimations. If the estimated SIR is less than the SIR target then the user equipment generates UP command, otherwise it generates DOWN command; in response the base station will increase (in case of UP) or decrease (in case of DOWN) its downlink transmit power.

The aim of the outer loop power control is to adjust the SIR target value used by the inner loop power control as previously explained, while maintaining a certain link quality. The quality target (e.g. BLER of the data) is set by the network and is expected from the user equipment to consistently maintain this target to ensure the desired quality of service is met throughout the session. Due to the varying radio link conditions e.g. user mobility, fast fading etc, the mapping between the SIR target and BLER changes over time. This is a key point as it requires frequent adjustment of the SIR target to maintain the desired value of BLER. This mechanism of adjusting the SIR target is also referred to as outer loop power control, quality control or outer loop scheme.

In systems such as enhanced uplink (EUL) version of WCDMA, the outer loop power control is configured to fulfill a quality target based on number of transmission attempts i.e.: "after x targeted transmissions, the residual block error rate should be y %".

The uplink outer loop power control for enhanced uplink channels adjusts the uplink DPCCH SIR target so the residual error rate after the stipulated maximum number of transmissions is fulfilled.

If the transmission is not successfully decoded after the stipulated maximum number of transmissions, the SIR target is increased by e.g. 0.5 dB. For every successfully decoded transmission, the corresponding SIR target is decreased by a factor inversely proportional to the error probability, e.g. about 0.01 dB if the error rate is 2%.

The transmission of data over the air in a wireless communication system is performed by using a plurality of different physical channels, for example Dedicated Physical Control CHannel (DPCCH), Dedicated Physical Data CHannel (DPDCH), Enhanced Dedicated Physical Control CHannel (E-DPCCH) and Enhanced Dedicated Physical Data CHannel (E-DPDCH). The power consumptions of these are related to each other by power offsets, i.e. β-values or gain factor relative the power level of the DPCCH.

However, the gain factor used in actual data transmission may be inaccurate, which in turn will affect the overall system performance. Either the reference gain factors obtained through simulations or the method to calculate other gain factors may result in inaccurate gain factors. E.g. when the gain factor is lower than required, more transmission attempts are required to guarantee the successful transmission. Since current EUL outer loop power control is based on transmission attempts, this actually means the SIR target is increased and more power is allocated to DPCCH. However, this is undesired.

A state-of-art implementation of the outer loop power control for EUL WCDMA increases the DPCCH SIR target when the number of transmission attempts is larger than TA target. This means that all other channels with a power offset to the DPCCH, such as the E-DPDCH, will also increase their transmit power.

However, in many cases, the reason for not fulfilling the TA target is due to too low power on the data channel, E-DPDCH, not due to too low power on the control channel DPCCH.

Since the DPCCH is continuously transmitted while E-DPDCH is transmitted more intermittently, increasing the SIR target and power on the DPCCH causes unnecessarily high interference.

Moreover, in a situation with bad coverage and high power usage on the user equipment, DPCCH will "steal" power from the data channel E-DPDCH.

Further on, there is also a problem with the constant power offsets for different transport block size sizes. It is difficult for the network to set the power offset and the enhanced data channel transport format combination (E-TFC) to match the TA target exactly. For example if the power offset is too low to fulfill the TA target, the DPCCH SIR will be increased until the TA target is fulfilled. Since it may be difficult to know beforehand what power offset can match the wanted TA target, this will most likely lead to an unwanted adjustment of the DPCCH SIR target, and thereby lead to a possibly unwanted interference increase or a too low DPCCH SIR target.

SUMMARY

Teachings herein advantageously provide a mechanism in a node that decreases the transmission power consumption and improves the capacity in a wireless communication system.

Embodiments of the present invention include a method in a first node, for generating a first correctness target value and a second correctness target value. The generated correctness target values are used by a power control of the radio signals sent from a second node to be received by the first node. The radio signals are sent over at least a first channel and a second channel. The method comprises the step of receiving a first signal on the first channel. Further, the method comprises the step of obtaining a first quality value of the first channel. Also, the method comprises the step of establishing a first difference between the obtained first quality value of the first channel with a first quality target value of the first channel. Yet further, the method comprises the step of generating a first correctness target value, based on the established difference. The method also comprises the step of receiving a second signal over the second channel. Further, the method also comprises the step of establishing that the second signal on the second channel has been correctly received. Also, the method comprises the step of obtaining the number of transmission attempts of the second signal over the second channel. Further yet, the method comprises the step of comparing the number of transmission attempts with a transmission attempts threshold value. Also, the method comprises the step of establishing a second difference between the obtained number of transmission attempts of the second channel with a second transmission attempts target value of the second channel. Still further, the method comprises the step of generating a second correctness target value, based on the established second difference of the second channel.

Embodiments of the present invention also include an arrangement in a first node, for generating a first correctness target value and a second correctness target value. The generated correctness target values are used by a power control of the radio signals sent from a second node to be received by the first node. The signals are sent over at least a first channel and a second channel. The arrangement comprises a first reception unit (i.e., circuit), adapted to receive a first signal on the first channel. Also, the arrangement comprises a first obtaining unit, adapted to obtain a first quality value of the first channel. Further yet, the arrangement comprises a first establishment unit, adapted to establish a difference between the first quality value of the first channel with a first quality target value of the first channel. The first node arrangement also comprises a first generation unit adapted to generate a first correctness target value, based on said established difference. Also, the arrangement comprises a second reception unit, adapted to receive a second signal over the second channel. The arrangement comprises a second obtaining unit, adapted to obtain if the second signal of the second channel has been correctly received. Further, the arrangement comprises a third establishing unit, adapted to establish a number of transmission attempts of the second signal over the second channel. Further yet, the arrangement comprises a comparison unit adapted to compare the number of transmission attempts with a transmission attempts threshold value. The first node arrangement further comprises a comparison unit adapted to compare the number of transmission attempts with a transmission attempts threshold value. The arrangement also comprises a second establishment unit, adapted to establish a second difference between a second establishment unit, adapted to establish a second difference between the number of transmission attempts of the second channel and a transmission attempts target value of the second channel. Further, the arrangement comprises a second generation unit adapted to generate a second correctness target value, based on the established second difference.

These and other embodiments advantageously permit the transmit power of the sending node to be set to different transmit power levels for different channels, and/or also to different transmit power levels for different sizes of the transmitted data units. Thus an improved power regulation for radio signals is achieved, which saves energy resources that can be used to increase the capacity and especially the coverage. Furthermore, it is not necessary to set the power offsets in advance; they will converge towards the wanted quality target i.e. the number of targeted transmission attempts.

BRIEF DESCRIPTION OF THE DRAWINGS

The present invention will now be described more in detail in relation to the enclosed drawings, in which.

DETAILED DESCRIPTION

Figure 1:
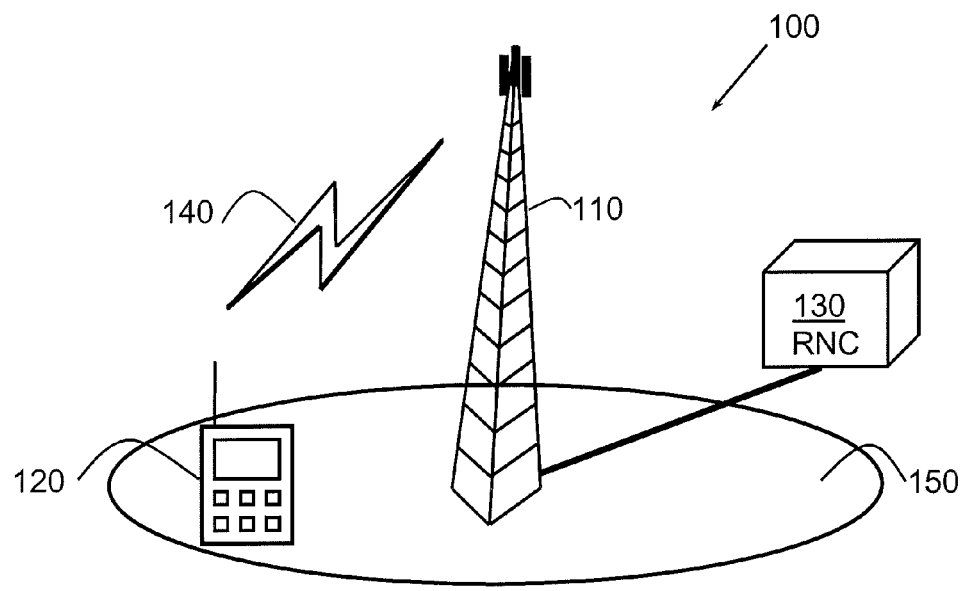
FIG. 1 is a block diagram illustrating embodiments of a wireless communication network.

FIG. 1 depicts a first node 110 communicating with a second node 120 within a cell 150 in a wireless communication system 100.

In some embodiments, the first node 110 may be a base station, a wireless communications station, a fixed station, a control station, a repeater or a similar arrangement for radio communication or any other kind of device capable of communicate radio resources, and the second node 120 a user equipment such as a mobile cellular radiotelephone, a Personal Digital Assistant (PDA), a laptop, a computer or any similar arrangement for radio communication.

However, the situation may as well be the opposite, such as in some other embodiments, wherein the first node 110 may be a user equipment such as a mobile cellular radiotelephone, a Personal Digital Assistant (PDA), a laptop, a computer or any similar arrangement for radio communication, and the second node 120 may be a base station, a wireless communications station, a fixed station, a control station, a repeater or a similar arrangement for radio communication or any other kind of device capable of communicate radio resources.

The wireless communication network 100 may also comprise a control node 130. The control node 130 may be e.g. a Radio Network Controller (RNC). The Radio Network Controller 130 is a governing element in the wireless communication network 100, responsible for control of base stations e.g. the first node 110, which are connected to the Radio Network Controller 130. The Radio Network Controller 130 may carry out radio resource management; some of the mobility management functions and may be the point where encryption may be done before user data is sent to and from the at least one user equipment 120.

The wireless communication system 100 may be based on technologies such as e.g. Code division multiple access (CDMA), Wideband Code Division Multiple Access (WCDMA), CDMA 2000, High Speed Packet Access (HSPA), including Enhanced UpLink (EUL) and High Speed Downlink Packet Data Access (HSDPA), EVDO version of CDMA 2000, etc.

Radio signals are sent from the second node 120 over a radio link 140 and are received by the first node 110. The power of the signal, which may be too high or too low to be suitable for communication, is adjustable by the first node 110 by e.g. running an inner loop power control, also called fast power control. The inner loop power control may run in both on signals sent from the first node 110 to the second node 120, i.e. downlink signals, and from the second node 120 to the first node 110, i.e. uplink signals. The aim of uplink and downlink inner loop power controls are inter alia to counter the effect of fast fading, while maintaining a desired SIR target. It also ensures to compensate for the near-far problem, so that a signal received from users far out in the cell are not swamped out by a stronger signal.

The second node 120 may estimate a correctness value, such as e.g. a SIR value e.g. on some known reference signals such as e.g. pilot symbols and compare it with some SIR target corresponding to a given quality of service target e.g. certain BER requirements, spreading factor used etc.

In e.g. WCDMA, downlink SIR may be measured on dedicated physical control channel (DPCCH), which comprises pilots and TPC command bits for uplink power control. If the measured SIR is less than SIR target then the inner loop power control at the first node 110 may generate UP command and send it to the second node 120, and if the measured SIR is more than SIR target then the inner loop power control at the first node 110 may generate DOWN command and send it to the second node 120. In response, the second node 120 will increase, in case of UP command, or decrease, in case of DOWN command, its downlink transmit power.

An outer loop power control is used by the first node 110 and/or the second node 120 to meet the desired quality of service targets. The outer loop power control may be implemented both in the first node 110 to meet the uplink quality target and in the second node 120 to meet the downlink quality target. It is important that despite varying radio conditions, which is often the case in wireless communication systems 100, the outer loop is able to maintain the desired quality of service target.

The outer loop power control may be used to maintain a certain link quality. The quality target may be set by the network 100 and it is expected from the first node 110 to consistently maintain this target to ensure the desired quality of service is met throughout the session. The value of the quality target, such as e.g. a BER or BLER target, may depend upon the type of service, such as speech, packet data, video data etc, which in turn impacts the correctness target, such as e.g. a SIR target used for inner loop power control. Thus, an adequate power level for providing the quality target of the radio link is easily achieved, during normal signal radio signal conditions.

However, any, some or even all of the method steps performed in the first node 110 may be distributed between the first node 110 and the control node 130. Thus some method steps according to the present method may be performed entirely or at least to some extent in the control node 130.

Figure 2:
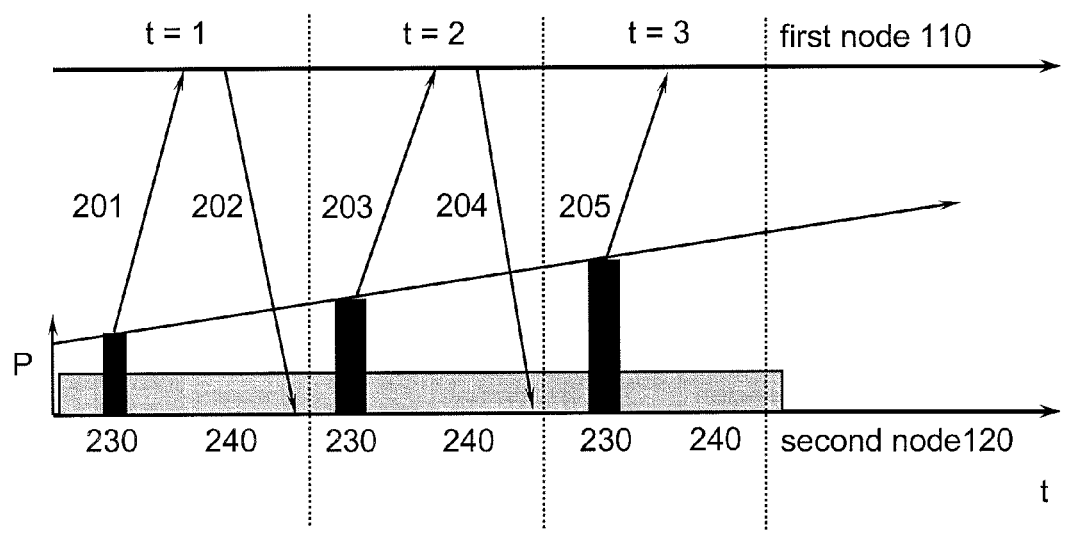
FIG. 2 is a block diagram illustrating signalling.

FIG. 2 is a block diagram illustrating signaling between the first node 110 and the second node 120 within a certain time sequence, according to some embodiments. The signaling may be made over a plurality of channels, such as e.g. the first channel 240 and the second channel 230. The first channel 240 may be a control channel such as e.g. DPCCH. The second channel 230 may be a data channel, such as e.g. E-DPDCH. The adjustment of the correctness target such as e.g. SIR target of the signals sent over e.g. the first channel 240 and the second channel 230 from the second node 120 to the first node 110 is made by the first node 110. According to some embodiments, the correctness target such as e.g. SIR target of the Signals sent over the channels 230, 240 are adjusted independently from each other.

The further step of generating an adjustment command for adjusting the transmission power of radio signals sent over the first channel 240, from the second node 120 may be performed by an inner loop power control, or fast loop power control.

The transmission power level of the signals sent over the first channel 240 may be altered in relation to a generated first correctness target value, such as a SIR target value, which may be used by an inner loop power control for generating adjustment commands for adjusting the transmission power of radio signals sent over the first channel 240 from the second node 120.

However, according to some embodiments, the generated first correctness target value of the first channel 240, such as a SIR target value, is adjusted only if the estimated quality value of the signals sent over the first channel 240 exceeds, or falls below, certain limit values. This relation may be illustrated by the formula:

IF $L1<q<L2$ THEN leave SIR target unchanged

IF $q<L1$ THEN increase SIR target

IF $L2<q$ THEN decrease SIR target

Where q is the estimated quality value, such as e.g. a BER value, of the first channel 240, L1 is a lower limit value and L2 is a high limit value.

According to yet another embodiment the correctness target of the first channel may also be adjusted by means of a so called jump algorithm.

In the illustrated scenario, the second node 120 start sending data 201 over the second channel 240 to the first node 110 at the time t=1. According to the present method, the first node 110 receive the signal, check if the signal has been sent before and if not, may set the transmission attempt to 1. Further, the number of transmission attempts may be compared against a transmission attempt threshold value. Further, at the first node 110, it is controlled if the data received over the second channel 230 was correctly received or if it was erroneously received. Such control may be made e.g. by performing a redundancy check e.g. CRC. If the data was erroneously received and the number of transmission attempts exceeds the transmission attempt target, a correctness target of the second channel 230, such as e.g. a SIR target or power offset adjustment command is sent 202 from the first node 110 to the second node 120. The second node 120 consequently increases the transmission power of the second channel 230, due to an increase of the correctness target of the second channel, and retransmits the data 203 at t=2. The first node 110 receives the data over the second channel 230, and may update the number of transmission attempts to 2. Further, the number of transmission attempts may be compared against a transmission attempt threshold value. Also, at the first node 110, it is controlled if the data received over the second channel 230 was correctly received or if it was erroneously received. Such control may be made e.g. by performing a redundancy check e.g. CRC. Again, the data was erroneously received, why the first node 110 generates a power adjustment command. The correctness target of second channel 230 sent 204 from the first node 110 to the second node 120.

The second node 120 increases the transmission power of the second channel 230, due to an increase of the correctness target of the second channel, and retransmits the data 205 at t=3, etc.

Embodiments illustrated by FIG. 2 advantageously permit the correctness target of the second channel, 230 to be adjusted without simultaneously adjusting the correctness target of the first channel, thus avoiding unnecessary increase of interference.

Figure 3:
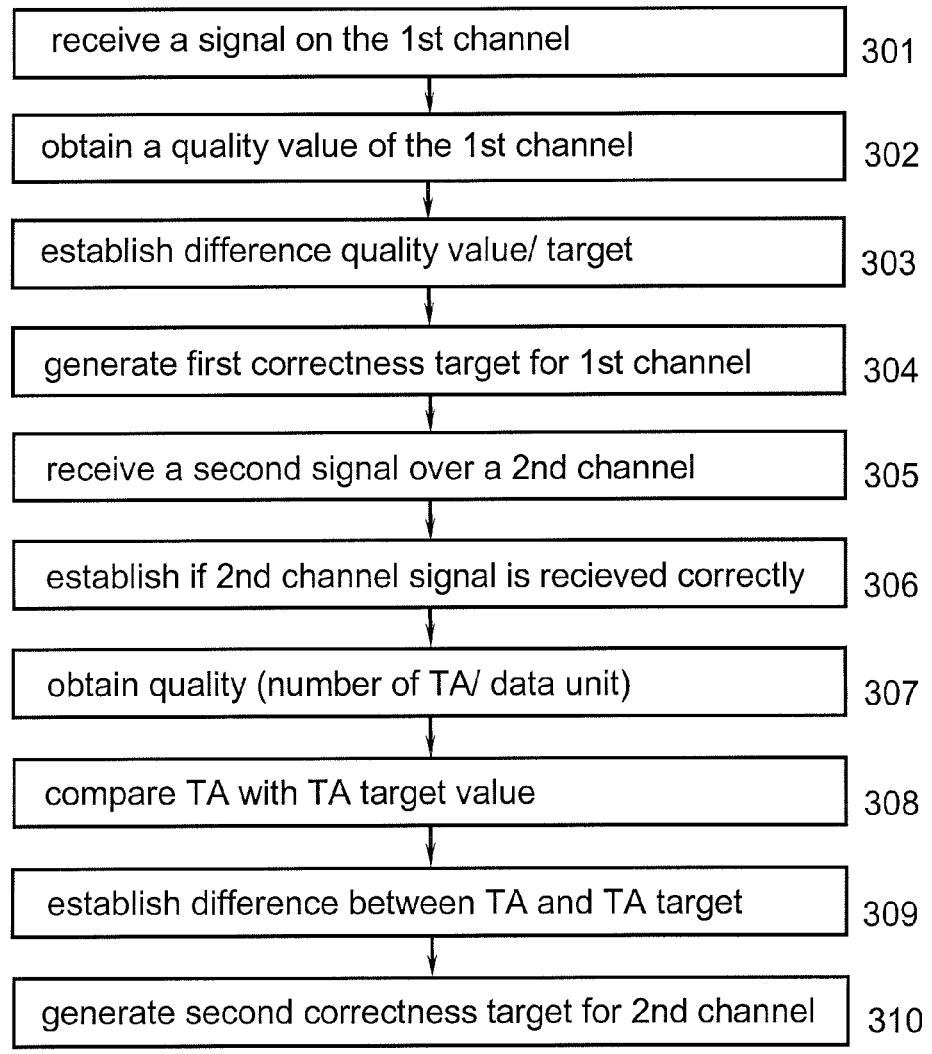
FIG. 3 is a flow chart illustrating embodiments of method steps.

FIG. 3 is a flowchart illustrating a method in a first node 110 for generating a first correctness target value and a second correctness target value, e.g. SIR target values. The first correctness target value and the second correctness target value may be e.g. SIR target values. The generated correctness target values may be used for adjusting the transmission power of radio signals sent from a second node 120 to be received by the first node 110. As an example, the correctness target value from the first channel 240 may be used for an inner loop power control. When data is sent over the second channel 230, the transmit power of the second channel may be calculated, based on the first channel correctness target and the second correctness channel target. Further, the signals are sent over at least a first channel 240 and a second channel 230. The generated correctness target values are sent from a first node 110 to the first node 110.

As previously discussed, the first node 110 may be a base station and the second node may be a mobile station. However, according to some embodiments, the first node 110 may be a mobile station and the second node 120 may be a base station.

The first channel 240 may be a control channel such as e.g. DPCCH, adapted to control and/or detect and/or decode the signalling over the second channel 230. The second channel 230 may be a data channel, such as e.g. E-DPDCH. To appropriately generate a first and a second correctness target value, the method may comprise a number of steps 301-310. It is however to be noted that some of the described method steps are optional and only comprised within some embodiments. Further, it is to be noted that the method steps 301-310 may be performed in any arbitrary chronological order and that some of them, e.g. step 301 and step 305, or even all steps may be performed simultaneously or in an altered or even completely reversed chronological order. The method comprises the steps of:

Step 301

The first node 110 receives a first signal on the first channel 240. The first signal on the first channel 240 is sent from the second node 120. The first signal is received at the first node 110. The signal may comprise e.g. pilot bits used for estimating the channel used for decoding data of the second channel.

Step 302

The first node 110 obtains a first quality value of the first channel 240. The quality value may be based on any arbitrary error rate calculation scheme such as e.g. Frame Error Ratio (FER), BLock Error Ratio (BLER), Bit Error Ratio (BER) or any other suitable measure such as outage probability. According to some embodiments, Bit Error Ratio (BER) is in particular advantageous to use. Thus the quality target used according to the present method may be based on bit, block or frame error rate, where the bit, block or frame error rate is measured using e.g. Cyclic Redundancy Check (CRC) or signaling quality. However, the quality target may also in some embodiments of the present methods be based on TPC command error and/or pilot bits, and the corresponding downlink quality may be measured on received TPC commands.

The step of obtaining a first quality value of the first channel 240 may in some embodiments be performed by making an estimation of the first quality value of the first channel 240. It may also according to some embodiments be performed by receiving a first quality value of the first channel 240 from another node.

Step 303

The first node 110 establishes a first difference between the obtained first quality value of the first channel 240 with a first quality target value of the first channel 240. Such difference may be established by comparing the obtained first quality value of the first channel 240 with a first quality target value of the first channel 240. The first quality target value of the first channel 240 may according to some embodiments have different values for different services. The value of the quality target value may depend upon the type of service, which in turn impacts the SIR target used for inner loop power control, as explained above. As a non limiting example, 1% BER target may be used for speech, 10% BER target may be used for packet data, 0.1 BER % may be used for video telephony and so on.

Step 304

The first node 110 generates a first correctness target value, based on said established first quality difference. The generated first correctness target value may be a SIR target value.

The first correctness target value may be generated, as a non limiting example only, according to a jump algorithm, e.g.:

$$SIR_t(k+1) = \begin{cases} SIR_t(k) + SIR_s & \text{if data unit is erroneous} \\ SIR_t(k) - \dfrac{BER_t}{1 - BER_t} SIR_s & \text{if data unit is correct} \end{cases}$$

$SIR_t$ denotes the SIR target, $BER_t$ is the target bit error ratio and $SIR_s$ is the step by which the target SIR is increased in each iteration. The $SIR_s$ is implementation dependent and may be e.g. 0.5 dB or 1 dB per data unit received.

The increase in SIR target in response to an erroneous data unit is much larger than the decrease in the SIR target when the data unit is correctly received. Thus, the decrease in the SIR target is linked to the BER target, which may be set e.g. by the network.

Another example to generate the first correctness target may be e.g.:

IF L1<q<L2 THEN leave SIR target unchanged
IF q<L1 THEN increase SIR target with e.g. $SIR_{inc}$
IF L2<q THEN decrease SIR target with e.g. $SIR_{dec}$ Step 305

The first node 110 receives a second signal over the second channel 230. The second signal may comprise data sent with a certain transport block size. The transport block size may vary for different data.

Step 306

The first node 110 establishes if the second channel signal is received correctly. If the second channel is correct or nor may be estimated by an arbitrary data quality algorithm such as e.g. CRC. The implementation of correctness control may according to some embodiments be different for different services.

Step 307

According to some embodiments, a number of transmission attempts of the second signal over the second channel 230 may be obtained. The optional step of obtaining a number of transmission attempts of the second signal over the second channel 230 may be performed by counting the number of transmission attempts, according to some embodiments. Thus a second quality value of the second signal may be the number of transmission attempts necessary for decoding the second channel correctly.

Step 308

According to some embodiments, the number of transmission attempts may be compared with a transmission attempts threshold value. The transmission attempts threshold value may according to some embodiments have different values for data blocks of different transport block size.

The transmission attempts threshold value may according to some embodiments have different values for different services.

Step 309

The first node 110 establishes a second difference between the obtained number of transmission attempts of the second channel 230 with a transmission attempts target value of the second channel 230. Such difference may be established by comparing number of transmission attempts of the second channel 230 with a transmission attempts target value of the second channel 230. The transmission attempts target value of the second channel 230 may according to some embodiments have different values for different services. Thus the quality of the second channel may be the number of transmission attempts and the quality target for the second channel may be the number of transmission attempt target.

Step 310

The first node 110 generates a second correctness target value, based on the established second difference, or quality, of the second channel 230. The second correctness target value for the second channel 230 may be a SIR target value. According to some embodiments however, the second correctness target value for the second channel 230 may be a power offset target value, related to the first SIR target value of the first channel 240.

If the quality such as e.g. the number of transmission attempts on the second channel 230 exceeds or is below the quality target such as e.g. a transmission attempt target, the correctness target of the second channel 230 may need to be adjusted. The correctness target adjustment of the second channel 230 may either be a power offset adjustment relative the first channel 240, or a the SIR target of the second channel 230. The adjustment command for adjusting the power offset, or SIR target, of channel 230, may be signalled from the first node 110 to the second node 120. The transmission of the SIR target or the adjustment commands may be done in a plurality of ways, e.g. using normal standard E-TFCI signalling or using an unused control channel bit fields or a new control channel.

Thus an increased second correctness target value e.g. a SIR target of the second channel 230, or an increased power offset relative the first channel 240 may be generated if the signal sent over the second channel 230 not is correctly received or has a quality value lower than a certain quality threshold value such as e.g. the number of transmission attempts exceeds the transmission attempts threshold value. This may be illustrated e.g. by the following algorithm:

*UE* Power Offset=*UE* Power Offset+adjustment

A decreased second correctness target value, e.g. a SIR target of the second channel 230 or a decreased power offset relative the first channel 240 may be generated if the data sent over the second channel 230 is correctly received or has a quality value exceeding a certain quality threshold value or if the number of transmission attempts falls below the transmission attempts threshold value. This may be illustrated e.g. by the following algorithm:

*UE* Power Offset=*UE* Power Offset−adjustment

If the SIR target of the second channel 230 is used as a correctness value, then it is possible to achieve the power offset by the following algorithm:

Power offset=E-DPDCH_SIR_Target−DPCCH_SIR_target

The transmit power for the second channel may then be:

Tx_power=DPCCH_power+Power_Offset

The difference in transmission power level of the second channel 230 in relation to the first channel 240 may according to some embodiments be adjusted in dependence of the transport block size (more specifically in WCDMA, E-TFCI). Thus data sent with different transport block size may be sent over the second channel 230 with different transmission power offsets or SIR targets. Further, according to some embodiments, the difference in transmission power offset of the second channel 230 in relation to the first channel 240 is adjusted only for transport blocks of the previously used transport block size. The power offset adjustment for a specific transport block size may also affect other adjacent transport block sizes, even if the adjacent transport block are not transmitted. For example by using some sort of interpolation between the power offsets/SIR targets over the transport blocks.

According to some embodiments, the SIR target of the first channel 240 may be increased even if the estimated quality value of the first channel 240 is lower than the quality target of the first channel 240, if the power offset level or correctness target level of the second channel 230 is increased more than a predetermined number of consecutive times. These embodiments may be implemented in order to prevent or avoid or at least reduce the consequences of a windup situation.

A windup situation refers to the case when the SIR target increases or decreases indefinitely in one direction. Eventually this will lead to a situation when the transmitted power either hit the maximum transmit power or minimum transmit power values allocated for each channel. This is an unstable behaviour and must therefore be avoided. Therefore, an anti-windup protection with certain advantage may be implemented in the first node 110. The main purpose of detecting windup and activating anti-windup is to limit indefinite or unnecessary increases or decreases of the SIR target.

Figure 4:
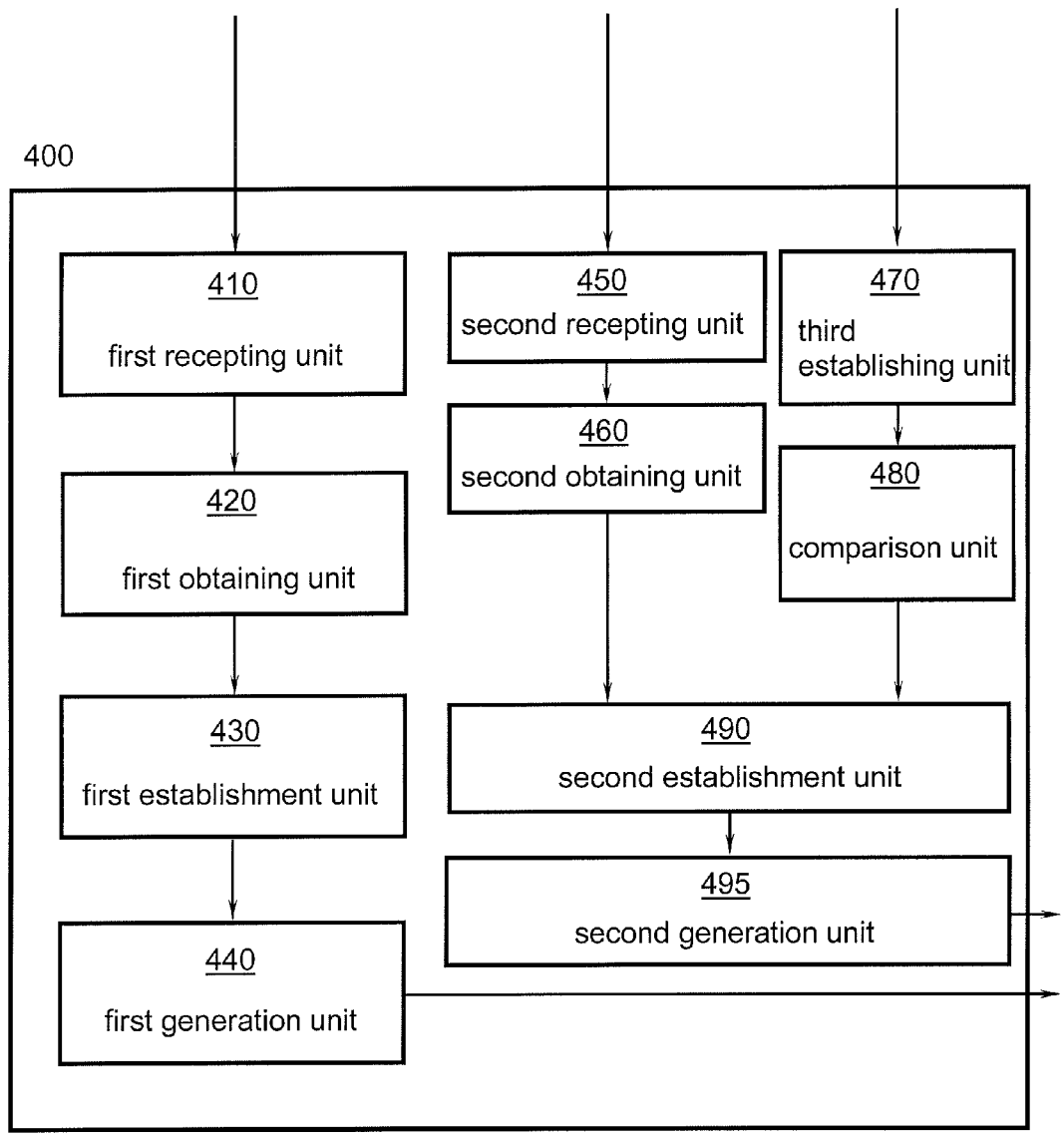
FIG. 4 is a block diagram illustrating embodiments of an arrangement in a node.

FIG. 4 is a block diagram illustrating embodiments of an arrangement in a node. To perform the method steps 301-310 in the first node 110, the first node 110 comprises an arrangement 400 as depicted in FIG. 4.

The arrangement 400 is situated in a first node 110, for generating a first correctness target value and a second correctness target value. The generated correctness target values are used by a power control of the radio signals sent from a second node 120 to be received by the first node 110. The radio signals are transmitted over a plurality of channels 230, 240, such as at least a first channel 240 and a second channel 230. The arrangement 400 comprises a first reception unit 410, adapted to receive a first signal on the first channel 240.

Further, the arrangement 400 comprises a first obtaining unit 420, adapted to obtain a quality value of the first channel 240. The obtaining unit 420 may according to some embodiments be adapted to estimate the quality value of the first channel 240 by measurements, calculations and/or estimations.

Also, the arrangement 400 comprises a first establishment unit 430, adapted to establish a difference between the obtained quality value of the first channel 240 with a quality target value of the first channel 240. The first establishment unit 430 may thus be arranged to compare the obtained quality value of the first channel 240 with a quality target value of the first channel 240 with each other and detect a difference. The first establishment unit 430 may further be arranged to detect the magnitude of the difference and/or if the difference in magnitude is positive or negative.

Further yet, the arrangement 400 comprises a first generation unit 440 adapted to generate a first correctness target value, e.g. a SIR target value based on said established difference between the obtained quality value and the quality target value.

The arrangement 400 further comprises a second reception unit 450, adapted to receive a second signal over the second channel 230.

Also, the arrangement 400 comprises a second establishing unit 460, adapted to establish if the second signal received over the second channel 230 has been correctly received.

Further yet, the arrangement 400 comprises a third establishing unit 490, adapted to establish a second difference between the second quality value of the second channel 230 with a second quality target value of the second channel 230.

Still further, the arrangement 400 comprises a second generation unit 495 adapted to generate a second correctness target value, such as e.g. a SIR target value, based on said established difference.

According to some embodiments, the arrangement 400 may comprise a third obtaining unit 470, adapted to obtain a number of transmission attempts of the second signal over the second channel 230. The second obtain unit 470 may according to yet some embodiments be adapted to measure, calculate or estimate the number of transmission attempts.

According to some embodiments, the arrangement 400 may comprise a comparison unit 480 adapted to compare the number of transmission attempts with a transmission attempts threshold value.

The present method may with particular advantage be used for technologies such as an Enhanced Uplink (EUL) or High-Speed Uplink Packet Access (HSUPA) in the wireless communication system 100, as the present method and arrangement implements a fast and accurate mechanism to adjust the transmission power levels on a plurality of channels 230, 240.

The description of the present method and arrangement has focused mainly and by means of example only, on the uplink power control in the base station 110. The present method and arrangement may however also be performed e.g. partly in the base station controller or radio network controller (RNC) 130, for example when the second node 120 is in soft handover.

Further by means of example and in order to simplify the comprehension, the term SIR has been consistently used in this text when describing a Signal to noise and Interference Ratio, which is the ratio between the level of a desired signal to the level of background noise and signal disturbance. The higher the ratio, the less obtrusive is the background noise. However, there exist other acronyms which are sometimes used to describe the same or a similar ratio, like e.g. the Signal to Noise Ratio (SNR or S/N), Signal to Noise and Interference Ratio (SNIR), Carrier to interference Ratio (CIR), Signal to Interference and Noise Ratio (SINR) or an inversion of the ratio, like Interference to Signal Ratio, (ISR). Any of these or similar ratios may be used in the context of this description instead of the SIR.

The methods for adjusting the transmission power of radio signals sent over a first channel 240 and a second channel 230 from a base station 110 according to the present methods can be implemented through one or more processors, such as the processor 430 or 490 in the arrangement 400 depicted in FIG. 4, together with computer program code for performing the functions of the methods. The program code mentioned above may also be provided as a computer program product, for instance in the form of a data carrier carrying computer program code for performing the method according to the present invention when being loaded into the first node 110 and/or the second node 120. The data carrier may be a CD ROM disc, a memory stick, or any other medium such as a disk or tape that can hold machine readable data. The computer program code may furthermore be provided as pure program code on a server and downloaded to the first node 110 and/or the second node 120 remotely.

While the methods and arrangements described in this document are susceptible to various modifications and alternative forms, specific embodiments thereof are shown by way of example in the drawings and are herein described in detail. It should be understood, however, that there is no intent to limit the present methods and arrangements to the particular forms disclosed, but on the contrary, the present methods and arrangements are to cover all modifications, equivalents, and alternatives falling within the spirit and scope of the methods and arrangements as defined by the claims.

Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present.

Furthermore, "connected" or "coupled" as used herein may include wirelessly connected or coupled. As used herein, the term "and/or" includes any and all combinations of one or more of the associated listed items.

Unless otherwise defined, all terms including technical and scientific terms used herein have the same meaning as commonly understood by one of ordinary skill in the art to which these methods and arrangements belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

For purposes of illustration, embodiments of the present methods and arrangements are described herein in the context of a user equipment 110 and a base station 120. It will be understood, however, that the present methods and arrangements are not limited to such embodiments and may be embodied generally as any electronic device that includes radio signal propagation means thereon.

The invention claimed is:

1. A method in a first node of adjusting correctness target values for controlling the power of radio signals sent to the first node by a second node over at least a control channel and a data channel, the control channel controlling the data channel, the method comprising:
- receiving a first signal on the control channel;
- obtaining a first quality value of the control channel;
- establishing a first difference as the difference between the first quality value and a first quality target value of the control channel;
- adjusting a first correctness target value based on said first difference for controlling the power of radio signals sent over the control channel;
- receiving a second signal over the data channel;
- establishing that the second signal has been correctly received;
- obtaining a number of transmission attempts taken to correctly receive the second signal;
- comparing the number of transmission attempts with a transmission attempts threshold value;
- establishing a second difference as the difference between the number of transmission attempts and a second transmission attempts target value of the data channel;
- without simultaneously adjusting the first correctness target value, adjusting a second correctness target value based on said second difference for controlling the power of radio signals sent over the data channel.

2. The method of claim 1, wherein adjusting the second correctness target value comprises adjusting the second correctness target value independently from the first correctness target value.

3. The method of claim 1, wherein adjusting the second correctness target value comprises:
- decreasing the second correctness target value if, for the second signal, the number of transmission attempts falls below the transmission attempts threshold value, or
- increasing the second correctness target value if the second signal has not been correctly received or if the number of transmission attempts exceeds the transmission attempts threshold value.

4. The method of claim 1, wherein adjusting the first correctness target value comprises:
- decreasing the first correctness target value if the first quality value exceeds a first quality threshold; or
- increasing the first correctness target value if the first quality value is below a second quality threshold.

5. The method of claim 1, wherein the first quality target value is set to different value levels for different services.

6. The method of claim 1, wherein the transmission attempts threshold value is set to different threshold value levels for different services.

7. The method of claim 1, wherein the second correctness target value is adjusted in dependence of a transport block size, such that data sent with different transport block sizes may be sent over the data channel with different transmission attempt target values.

8. The method of claim 1, wherein the second correctness target value is adjusted only for transport blocks of the previously used transport block size.

9. The method of claim 1, wherein, if the second correctness target value is increased more than a predetermined number of consecutive times, the first correctness target value is increased even if the first quality value is lower than the first quality target value of the control channel.

10. The method of claim 1, wherein the first quality value is a Bit Error Rate (BER) value and the first quality target value is a Bit Error Rate (BER) target value.

11. The method of claim 1, wherein at least one of the first correctness target value and the second correctness target value is a signal-to-interference ratio, SIR, target value.

12. The method of claim 1, wherein the first node comprises a base station.

13. The method of claim 1, wherein the first node comprises a user equipment.

14. The method of claim 1, wherein each of the first correctness target value and the second correctness target value is a signal-to-interference ratio, SIR, target value.

15. The method of claim 1, wherein the first correctness target value is a signal-to-interference ratio, SIR, target value and the second correctness target value is a power offset relative to the control channel.

16. An apparatus in a first node configured to adjust correctness target values for controlling the power of radio signals sent to the first node by a second node over at least a control channel and a data channel, the control channel controlling the data channel, the apparatus comprising:
- a first reception circuit configured to receive a first signal on the control channel,
- a first obtaining circuit configured to obtain a first quality value of the control channel,
- a first establishment circuit configured to establish a first difference as the difference between the first quality value and a first quality target value of the control channel,
- a first generation circuit configured to adjust a first correctness target value based on said first difference for controlling the power of radio signals sent over the control channel,
- a second reception circuit configured to receive a second signal over the data channel,
- a second establishment circuit configured to establish if the second signal has been correctly received,
- a second obtaining circuit configured to obtain a number of transmission attempts taken to correctly receive the second signal,
- a comparison circuit configured to compare the number of transmission attempts with a transmission attempts threshold value,
- a third establishment circuit configured to establish a second difference as the difference between the number of transmission attempts and a transmission attempts target value of the data channel, and
- a second generation circuit configured to adjust a second correctness target value based on said second difference for controlling the power of radio signals sent over the data channel, without the first generation circuit simultaneously adjusting the first correctness target value.

* * * * *